US012646666B2

(12) United States Patent
Zhang

(10) Patent No.: US 12,646,666 B2
(45) Date of Patent: Jun. 2, 2026

(54) BUTTON ASSEMBLY AND ELECTRONIC DEVICE

(71) Applicant: PEGATRON CORPORATION, Taipei City (TW)

(72) Inventor: Jun-Feng Zhang, Taipei City (TW)

(73) Assignee: PEGATRON CORPORATION, Taipei City (TW)

(*) Notice: Subject to any disclaimer, the term of this patent is extended or adjusted under 35 U.S.C. 154(b) by 323 days.

(21) Appl. No.: 18/610,272

(22) Filed: Mar. 20, 2024

(65) Prior Publication Data

US 2024/0412929 A1 Dec. 12, 2024

(30) Foreign Application Priority Data

Jun. 9, 2023 (TW) ................................ 112121721

(51) Int. Cl.
*H01H 13/14* (2006.01)
*H01H 13/04* (2006.01)

(52) U.S. Cl.
CPC ............ *H01H 13/14* (2013.01); *H01H 13/04* (2013.01); *H01H 2239/074* (2013.01)

(58) Field of Classification Search
CPC .. H01H 13/14; H01H 13/04; H01H 2239/074; H01H 25/06; H01H 2223/002; H01H 2231/028; H01H 13/06; H01H 13/705; H01H 13/10; H01H 13/70; H01H 13/704; H01H 13/7065; H01H 13/7006; H01H 13/7057; H01H 13/78; H01H 13/79;
(Continued)

(56) References Cited

U.S. PATENT DOCUMENTS 6,396,771 B2 * 5/2002 Paratte ................... G04C 10/00 368/203
11,194,298 B2 * 12/2021 Roach .................... G04G 9/007
2015/0041289 A1 * 2/2015 Ely ...................... G04B 27/002 200/4

FOREIGN PATENT DOCUMENTS

| | | |
|---|---|---|
| CN | 105556433 | 5/2016 |
| CN | 114072046 | 2/2022 |
| TW | 202029927 | 8/2020 |

OTHER PUBLICATIONS

Stafford Manufacturing Corp., "Pipe Adapter Bushings", accessed on Feb. 24, 2023, available at: https://shaft-collars-couplings.staffordmfg.com/viewitems/collars-to-fit-pipes/pipe-adapter-bushings.
(Continued)

*Primary Examiner* — Ahmed M Saeed
(74) *Attorney, Agent, or Firm* — J.C. PATENTS

(57) ABSTRACT

A button assembly is adapted to be installed at a conductive casing. Two opposite sides of the conductive casing respectively have first and second openings, and the first opening is communicated with the second opening. The button assembly includes a conductive button, a first insulating sleeve, and a second insulating sleeve. The conductive button includes a button part corresponding to the first opening and a shaft part connected to the button part and passing through the second opening from the first opening. The first insulating sleeve includes a first shaft hole and a first lateral slit. The second insulating sleeve includes a second shaft hole and a second lateral slit. The first insulating sleeve is sleeved on the shaft part and located at the first opening. The second insulating sleeve is sleeved on the shaft part and located at the second opening. An electronic device is also provided.

14 Claims, 10 Drawing Sheets

(58) Field of Classification Search
CPC .... H01H 13/52; H01H 13/703; H01H 13/507; H01H 3/12; H01H 13/20
See application file for complete search history.

(56) References Cited

OTHER PUBLICATIONS

Autodíly Štancl, "Gear shift bearing housing Octavia I. for Skoda OCTAVIA, model No. 1J0711067L, 6RF711067A", accessed on Feb. 24, 2023, available at: https://www.autodily-stancl.cz/octavia/18-92-kw-agn_spojka-setrvacnik-prevodovka/pouzdro-loziska-razeni-octavia-i.html.

* cited by examiner

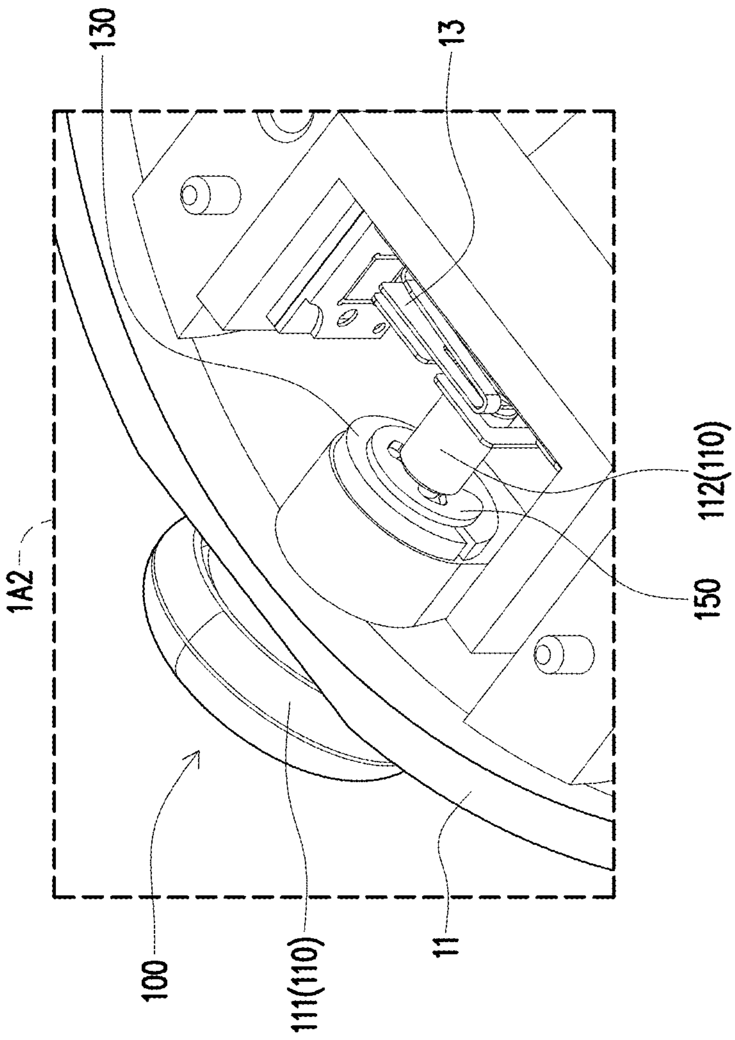
FIG. 1A2
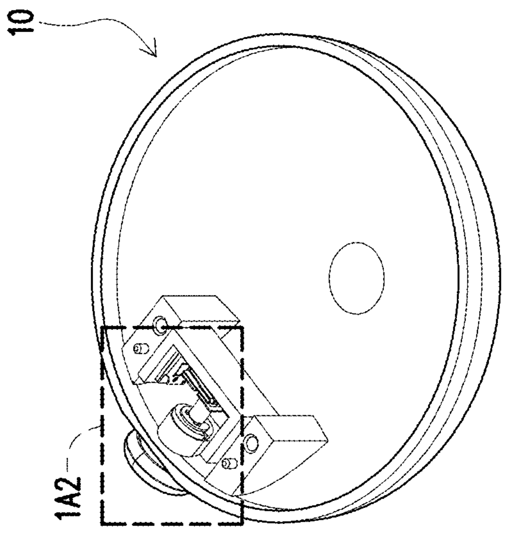
FIG. 1A1

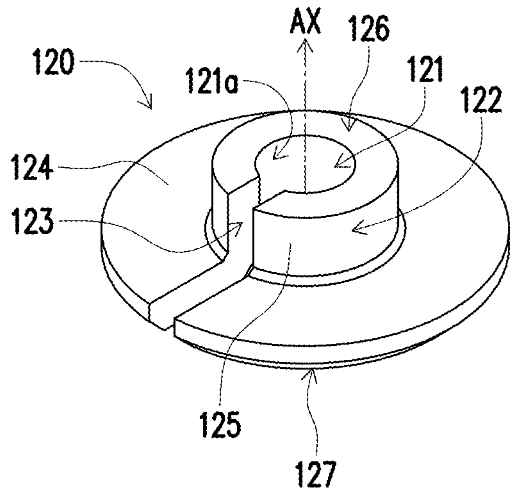
FIG. 1E1
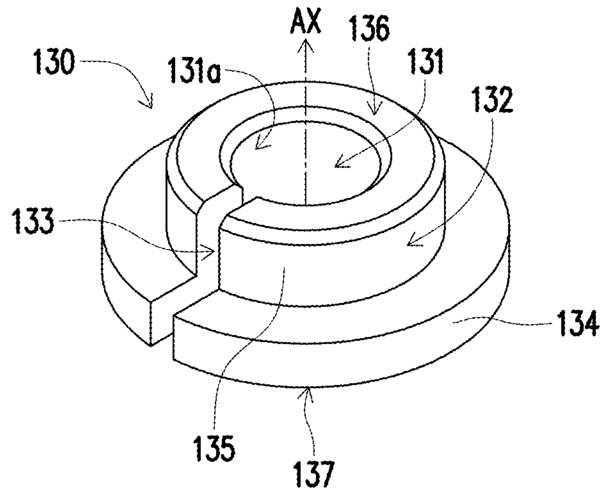
FIG. 1E2
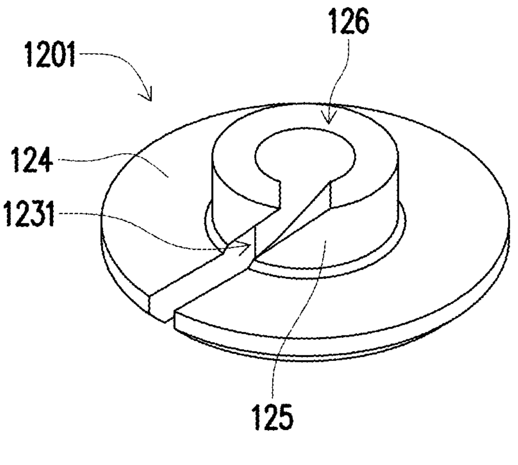
FIG. 1F1
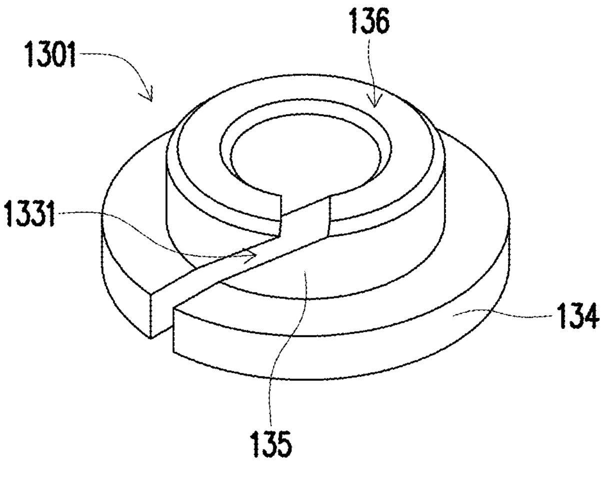
FIG. 1F2

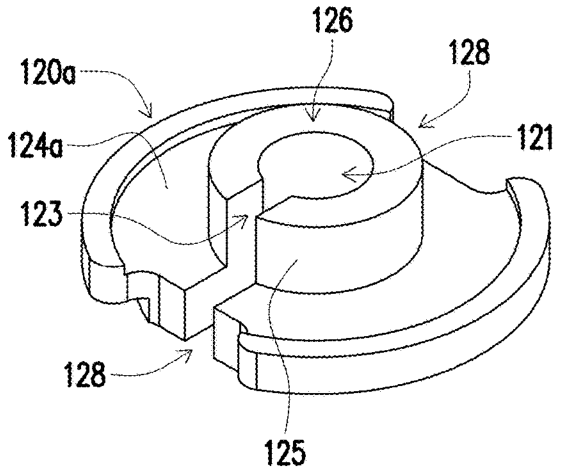
FIG. 2E1
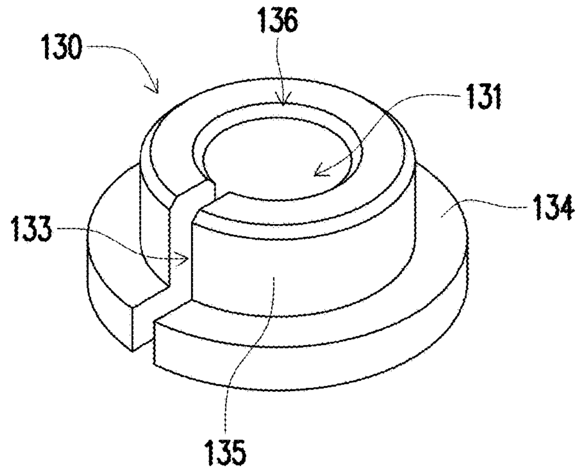
FIG. 2E2
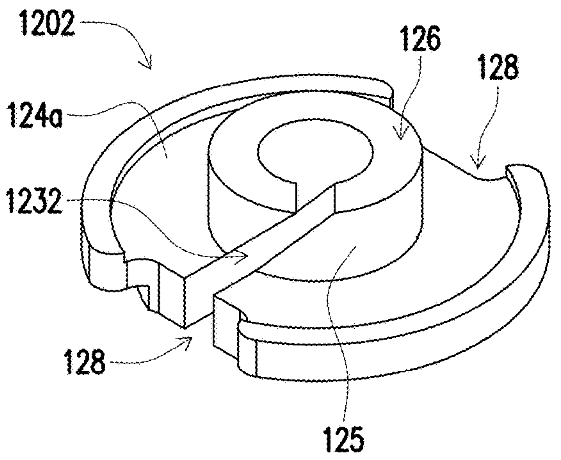
FIG. 2F1
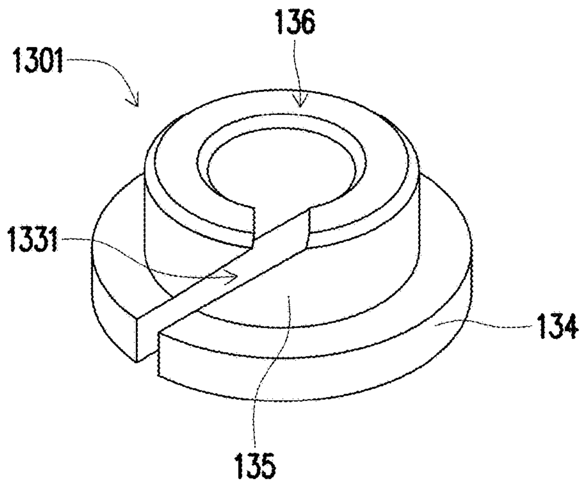
FIG. 2F2

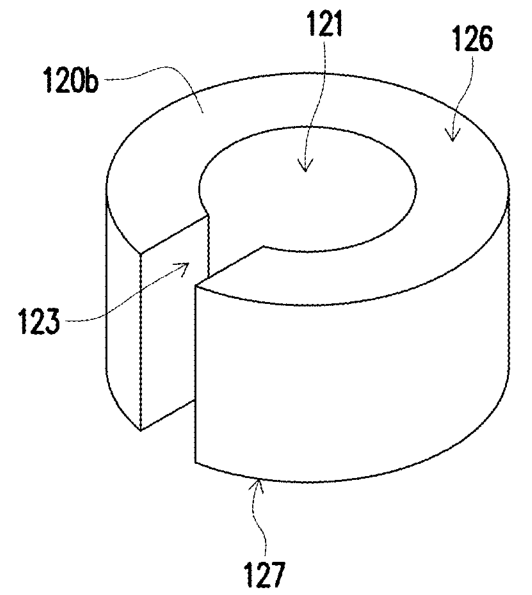
FIG. 3C1
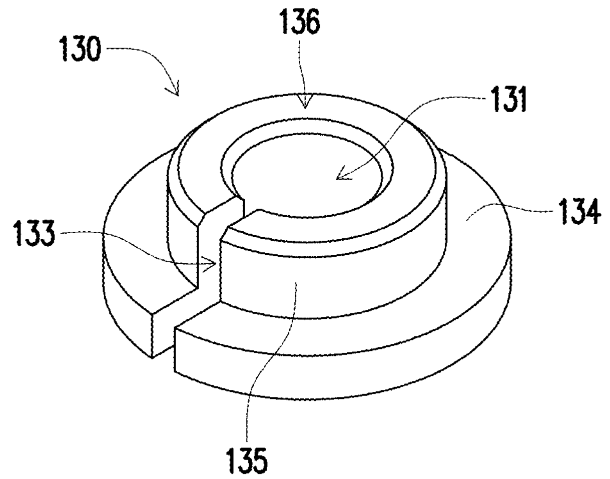
FIG. 3C2
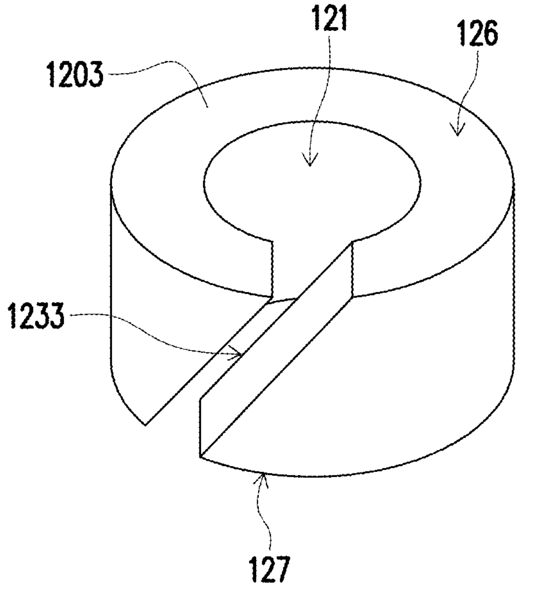
FIG. 3D1
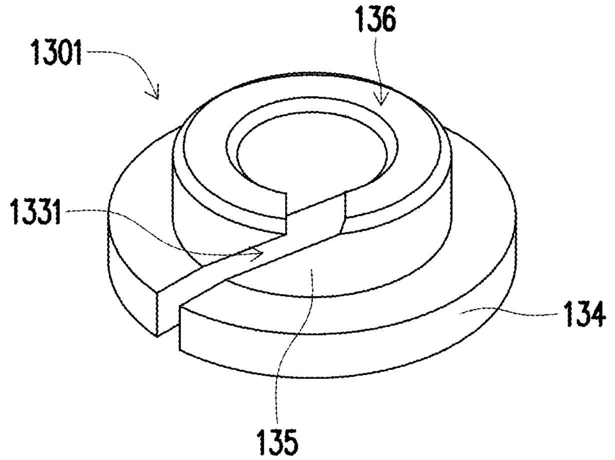
FIG. 3D2

BUTTON ASSEMBLY AND ELECTRONIC DEVICE

CROSS-REFERENCE TO RELATED APPLICATION

This application claims the priority benefit of Taiwan application serial no. 112121721, filed on Jun. 9, 2023. The entirety of the above-mentioned patent application is hereby incorporated by reference herein and made a part of this specification.

BACKGROUND

Technical Field

The disclosure relates to a button assembly, and particularly relates to a button assembly and an electronic device using the same.

Description of Related Art

Along with development of science and technology and improvement of health awareness, most wearable electronic devices integrate a measurement function of physiological signals, such as heart rate, blood pressure, blood oxygen concentration or electrocardiogram (ECG) and other measurement functions. Taking a wearable electronic device integrated with an ECG measurement function as an example, an electrode located on a device body (such as a casing) may serve as a first electrode to contact a hand of a user, and a finger of the user may contact and press a metal button located on a side edge of the device body to serve as a second electrode to perform ECG measurements. In detail, the metal button is disposed through the device body. If the device body is a metal casing, the pressed metal button may be in contact with the metal casing due to deflection or shaking, resulting in a short circuit, which not only causes poor reliability of the ECG measurement, but also affects an operating feel of the user.

SUMMARY

The disclosure is directed to a button assembly and an electronic device using the same, which not only helps to improve reliability, but also has a better operating feel.

The disclosure provides a button assembly adapted to be installed at a conductive casing. Two opposite sides of the conductive casing respectively have a first opening and a second opening, and the first opening is communicated with the second opening. The button assembly includes a conductive button, a first insulating sleeve, and a second insulating sleeve. The conductive button includes a button part arranged outside the conductive casing and a shaft part connected to the button part. The button part corresponds to the first opening, and the shaft part passes through the second opening from the first opening. The first insulating sleeve includes a first shaft hole and a first lateral slit communicated with the first shaft hole. The first insulating sleeve is sleeved on the shaft part through the first shaft hole and located at the first opening. The second insulating sleeve includes a second shaft hole and a second lateral slit communicated with the second shaft hole. The second insulating sleeve is sleeved on the shaft part through the second shaft hole and located at the second opening.

The disclosure provides an electronic device including a conductive casing, a button assembly, a circuit board and a conductive elastic piece. Two opposite sides of the conductive casing have a first opening and a second opening respectively, and the first opening is communicated with the second opening. The button assembly is installed at the conductive casing, and includes a conductive button, a first insulating sleeve, and a second insulating sleeve. The conductive button includes a button part and a shaft part connected to the button part. The button part corresponds to the first opening, and the shaft part passes through the second opening from the first opening. The first insulating sleeve includes a first shaft hole and a first lateral slit communicated with the first shaft hole. The first insulating sleeve is sleeved on the shaft part through the first shaft hole and located at the first opening. The second insulating sleeve includes a second shaft hole and a second lateral slit communicated with the second shaft hole. The second insulating sleeve is sleeved on the shaft part through the second shaft hole and located at the second opening. The circuit board is disposed in the conductive casing and corresponding to the second opening. The conductive elastic piece is disposed between the second insulating sleeve and the circuit board. The shaft part extends toward the circuit board, and the conductive elastic piece electrically contacts the shaft part and the circuit board.

Based on the above description, in the button assembly and electronic device of the disclosure, the conductive button and the conductive casing are separated by two insulating sleeves, which prevents the pressed conductive button from contacting the conductive casing to cause a short circuit, thus helping to improve operational reliability. On the other hand, since both insulating sleeves have lateral slits, during a process of installing the insulating sleeves on the shaft part of the conductive button, the lateral slits may expand inner diameters of the shaft holes to match an outer diameter of the shaft part. Therefore, the insulating sleeves may be installed and tightly fitted on the shaft part without leaving a gap between the shaft hole and the shaft part, which prevents the conductive button from shaking due to the gap between the shaft hole and the shaft part during operation, and provides a better operating experience to the user.

To make the aforementioned more comprehensible, several embodiments accompanied with drawings are described in detail as follows.

BRIEF DESCRIPTION OF THE DRAWINGS

FIG. 1A1 is a schematic diagram of an electronic device according to an embodiment of the disclosure.

FIG. 1A2 is an enlarged schematic view of the area designated as 1A2 in FIG. 1A1.

FIG. 1E1 and FIG. 1E2 are respectively schematic diagrams of a first insulating sleeve and a second insulating sleeve of FIG. 1B.

FIG. 1F1 and FIG. 1F2 are respectively schematic diagrams of a first insulating sleeve and a second insulating sleeve of another example.

FIG. 2E1 and FIG. 2E2 are respectively schematic diagrams of a first insulating sleeve and a second insulating sleeve of FIG. 2A.

FIG. 2F1 and FIG. 2F2 are respectively schematic diagrams of the first insulating sleeve and the second insulating sleeve of another example.

FIG. 3C1 and FIG. 3C2 are respectively schematic diagrams of a first insulating sleeve and a second insulating sleeve of FIG. 3A.

FIG. 3D1 and FIG. 3D2 are respectively schematic diagrams of the first insulating sleeve and the second insulating sleeve of another example.

DESCRIPTION OF THE EMBODIMENTS

Figure 1B:
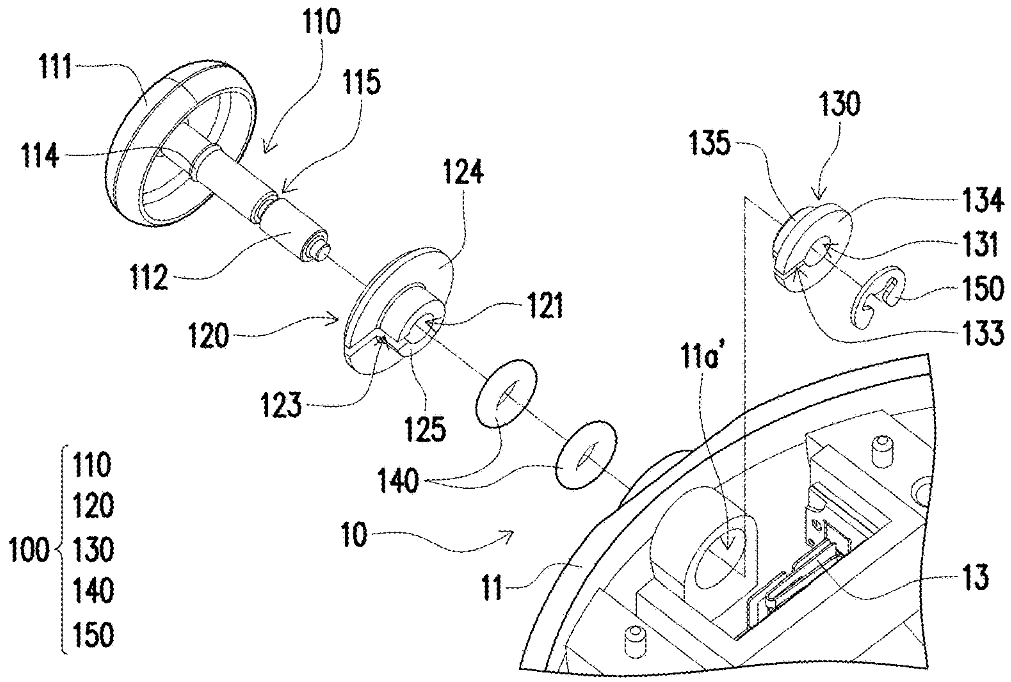
FIG. 1B is a schematic exploded view of a partially enlarged area in FIG. 1A1.
Figure 1C:
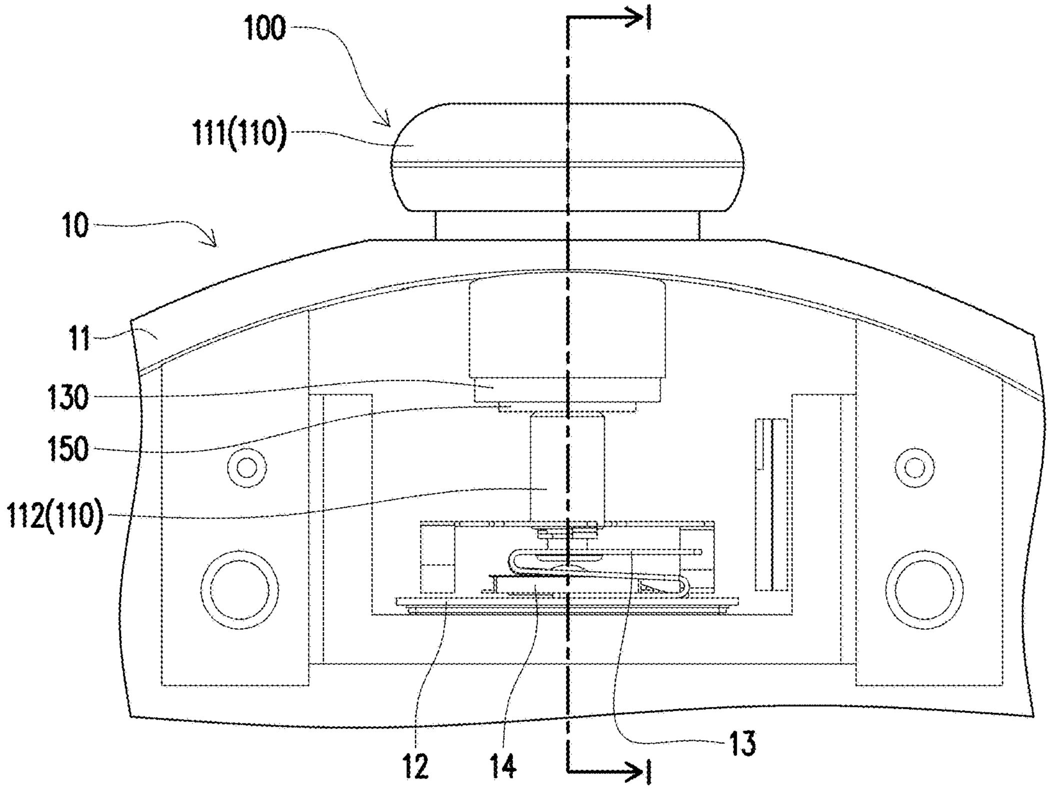
FIG. 1C is a schematic top view of the partially enlarged area in FIG. 1A1.
Figure 1D:
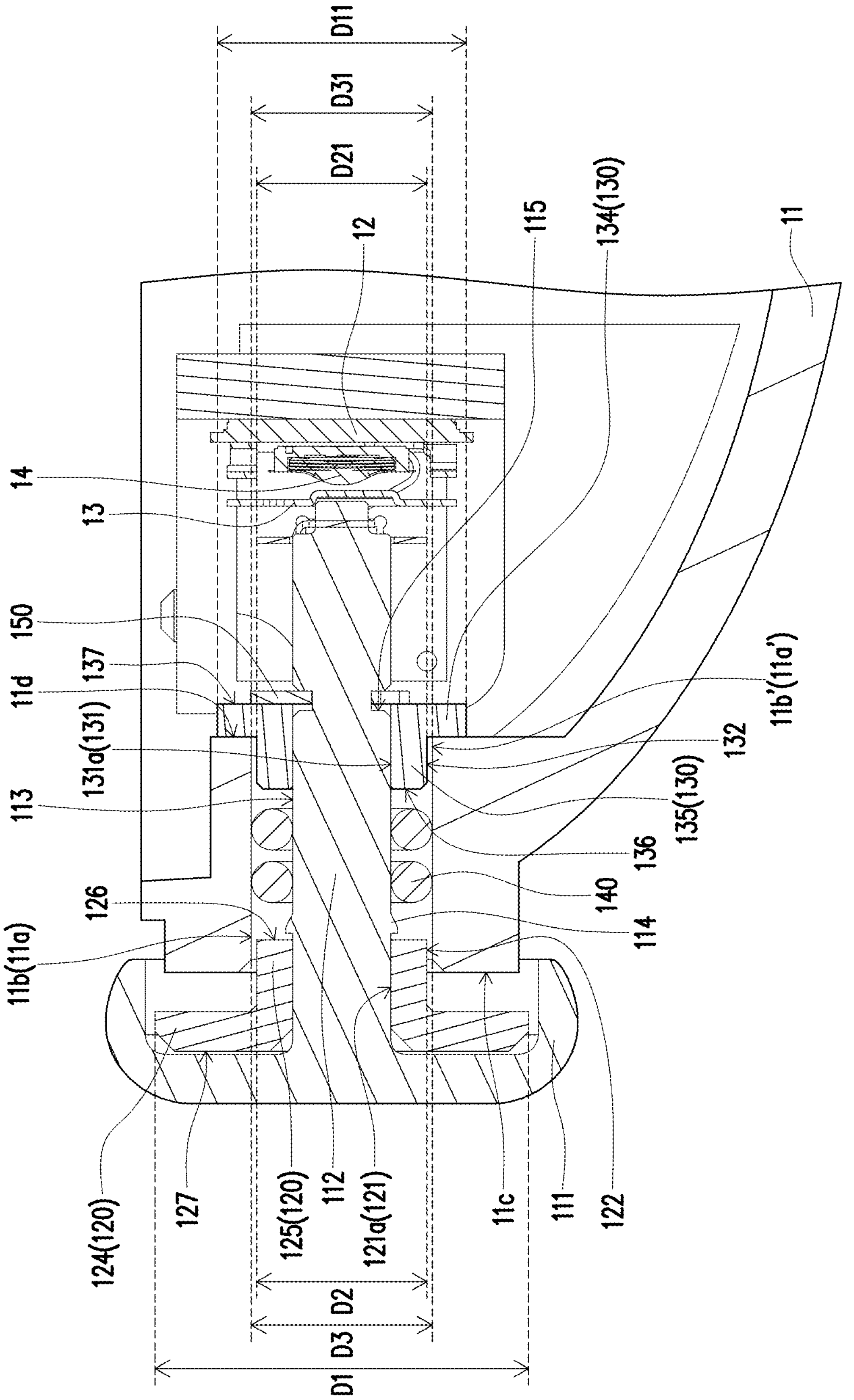
FIG. 1D is a schematic cross-sectional view along a section line I-I of FIG. 1C.

FIG. 1A1 is a schematic diagram of an electronic device according to an embodiment of the disclosure. FIG. 1A2 is an enlarged schematic view of the area designated as 1A2 in FIG. 1A1. FIG. 1B is a schematic exploded view of a partially enlarged area in FIG. 1A1. FIG. 1C is a schematic top view of the partially enlarged area in FIG. 1A1. FIG. 1D is a schematic cross-sectional view along a section line I-I of FIG. 1C. Referring to FIG. 1A1, FIG. 1A2, FIG. 1B, and FIG. 1C, in the embodiment, an electronic device 10 may be a wearable electronic device, such as a smart watch or a smart bracelet, but the disclosure is not limited thereto. In detail, the electronic device 10 includes a conductive casing 11, a circuit board 12, a conductive elastic piece 13 and a button assembly 100, and the circuit board 12, the conductive elastic piece 13 and the button assembly 100 are installed on the conductive casing 11.

The circuit board 12 is fixed in the conductive casing 11, where the conductive elastic piece 13 is disposed in the conductive casing 11 and is located on a side of the circuit board 12 facing the button assembly 100. Namely, the conductive elastic piece 13 is disposed between the button assembly 100 and the circuit board 12.

Referring to FIG. 1B to FIG. 1D, two opposite sides of the conductive casing 11 have a first opening 11*a* and a second opening 11*a*' respectively, where the first opening 11*a* is communicated with the second opening 11*a*', and the conductive elastic piece 13 and the circuit board 12 are disposed in the conductive casing 11 and corresponding to the second opening 11*a*'. On the other hand, the button assembly 100 includes a conductive button 110, a first insulating sleeve 120, and a second insulating sleeve 130, and the first insulating sleeve 120 and the second insulating sleeve 130 are sleeved on the conductive button 110. In detail, a part of the conductive button 110 is disposed outside the conductive casing 11. Another part of the conductive button 110 passes through the first opening 11*a* and the second opening 11*a*', and extends toward the circuit board 12 to contact the conductive elastic piece 13. In more detail, the conductive elastic piece 13 is disposed between the conductive button 110 and the circuit board 12, and electrically contacts the conductive button 110 and the circuit board 12 to form a conductive path. For example, the conductive casing 11, the conductive elastic piece 13 and the conductive button 110 may be made of metal, alloy or other conductive materials.

In the embodiment, the conductive button 110 includes a button part 111 provided outside the conductive casing 11 and a shaft part 112 connected to the button part 111, and the button part 111 corresponds to the first opening 11*a*. The shaft part 112 passes through the second opening 11*a*' from the first opening 11*a* and extends toward the circuit board 12. An end of the shaft part 112 electrically contacts one side of the conductive elastic piece 13, and the other side of the conductive elastic piece 13 electrically contacts the circuit board 12. A finger of a user may contact and press the button part 111 to perform electrocardiogram measurement or other physiological signal measurement. For example, the button part 111 and the shaft part 112 may be an integrally formed structure, or may be a structure formed by assembling two components.

On the other hand, the first insulating sleeve 120 and the second insulating sleeve 130 are sleeved on the shaft part 112 and are respectively located at the first opening 11*a* and the second opening 11*a*', and may separate the shaft part 112 and the conductive casing 11 to prevent the conductive button 110 from contacting the conductive casing 11 to cause a short circuit, so as to improve operational reliability.

As shown in FIG. 1B and FIG. 1D, the first insulating sleeve 120 corresponds to the button part 111 and is provided outside the conductive casing 11 and inserted into the first opening 11*a*. The second insulating sleeve 130 is disposed inside the conductive casing 11 and inserted into the second opening 11*a*'. In addition, the first insulating sleeve 120 is located between the button part 111 and the second insulating sleeve 130, and the conductive elastic piece 13 is located between the second insulating sleeve 130 and the circuit board 12.

In detail, the first insulating sleeve 120 has a first shaft hole 121 for the shaft part 112 to pass through, and the first insulating sleeve 120 is sleeved on the shaft part 112 through the first shaft hole 121. Similarly, the second insulating sleeve 130 has a second shaft hole 131 for the shaft part 112 to pass through, and the second insulating sleeve 130 is sleeved on the shaft part 112 through the second shaft hole 131. There are gaps between an outer wall surface 122 of the first insulating sleeve 120 and an inner wall surface 11*b* of the first opening 11*a*, and between an outer wall surface 132 of the second insulating sleeve 130 and an inner wall surface 11*b*' of the second opening 11*a*' respectively, and an inner wall surface 121*a* of the first shaft hole 121 and an inner wall surface 131*a* of the second shaft hole 131 are both in close contact with the outer wall surface 113 of the shaft part 112.

When the user's finger presses the button part 111, the shaft part 112, the first insulating sleeve 120 and the second insulating sleeve 130 synchronously slide toward the circuit board 12 to ensure electrical isolation between the shaft part 112 and the conductive casing 11. On the other hand, a sliding gap is only reserved between the outer wall surface 122 of the first insulating sleeve 120 and the inner wall surface 11*b* of the first opening 11*a* and between the outer wall surface 132 of the second insulating sleeve 130 and the inner wall surface 11*b*' of the second opening 11*a*', so that a shaking degree generated when pressing the conductive button 110 may be greatly reduced to provide the user with better operating feel.

FIG. 1E1 and FIG. 1E2 are respectively schematic diagrams of the first insulating sleeve and the second insulating sleeve of FIG. 1B. As shown in FIG. 1B, FIG. 1D, FIG. 1E1, and FIG. 1E2, the first insulating sleeve 120 further has a first lateral slit 123 communicated with the first shaft hole 121 to facilitate expansion and deformation of the first insulating sleeve 120 when it is sleeved on the shaft part 112, so as to fit tightly to the shaft part 112. Similarly, the second insulating sleeve 130 further has a second lateral slit 133 communicated with the second shaft hole 131 to facilitate expansion and deformation of the second insulating sleeve 130 when it is sleeved on the shaft part 112, so as to fit tightly to the shaft part 112. The first insulating sleeve 120 and the second insulating sleeve 130 may be made of plastic, silicone, rubber or other insulating materials with elasticity, wear resistance and self-lubricating properties.

Before the first insulating sleeve 120 and the second insulating sleeve 130 are sleeved on the shaft part 112, an inner diameter of the first shaft hole 121 and an inner diameter of the second shaft hole 131 may be smaller than an outer diameter of the shaft part 112. After the first insulating sleeve 120 and the second insulating sleeve 130 are sleeved on the shaft part 112, the inner diameter of the first shaft hole 121 and the inner diameter of the second shaft hole 131 may be equal to the outer diameter of the shaft part 112, and the first insulating sleeve 120 and the second insulating sleeve 130 are retained on the shaft part 112 by an elastic restoring force. Namely, after the first insulating sleeve 120 and the second insulating sleeve 130 are sleeved on the shaft part 112, the inner diameter of the first shaft hole 121 and the inner diameter of the second shaft hole 131 change from small to large.

As shown in FIG. 1B, FIG. 1D, FIG. 1E1, and FIG. 1E2, the first insulating sleeve 120 includes a first seat part 124 provided in the button part 111 and a first sleeve part 125 connected to the first seat part 124, and the first sleeve part 125 is inserted into the first opening 11*a*. An outer diameter D1 of the first seat part 124 is larger than an outer diameter D2 of the first sleeve part 125 and an inner diameter D3 of the first opening 11*a*, and the outer diameter D2 of the first sleeve part 125 is smaller than the inner diameter D3 of the first opening 11*a*. The first seat part 124 may separate the button part 111 from the outer surface 11*c* of the conductive casing 11 to prevent the conductive button 110 from contacting the conductive casing 11 to cause a short circuit.

In addition, the second insulating sleeve 130 includes a second seat part 134 abutting an inner surface 11*d* of the conductive casing 11 and a second sleeve part 135 connected to the second seat part 134, and the second sleeve part 135 is inserted into the second opening 11*a*'. An outer diameter D11 of the second seat part 134 is larger than an outer diameter D21 of the second sleeve part 135 and an inner diameter D31 of the second opening 11*a*', and the outer diameter D21 of the second sleeve part 135 is smaller than the inner diameter D31 of the second opening 11*a*'. The second seat part 134 may separate the shaft part 112 from the inner surface 11*d* of the conductive casing 11 to prevent the conductive button 110 from contacting the conductive casing 11 to cause a short circuit.

As shown in FIG. 1D, FIG. 1E1, and FIG. 1E2, the first shaft hole 121 of the first insulating sleeve 120 penetrates through the first seat part 124 and the first sleeve part 125 in an axial direction AX, and the first lateral slit 123 penetrates through the first seat part 124 and the first sleeve part 125 outward from the inner wall surface 121*a* of the first shaft hole 121, for example, penetrates through the first seat part 124 and the first sleeve part 125 in a radial direction. Similarly, the second shaft hole 131 of the second insulating sleeve 130 penetrates through the second seat part 134 and the second sleeve part 135 in the axial direction AX, and the second lateral slit 133 penetrates through the second seat part 134 and the second sleeve part 135 outward from the inner wall surface 131*a* of the second shaft hole 131, for example, penetrates through the second seat part 134 and the second sleeve part 135 in the radial direction.

As shown in FIG. 1D, FIG. 1E1, and FIG. 1E2, the first insulating sleeve 120 further has a first surface 126 facing the second insulating sleeve 130 and a second surface 127 opposite to the first surface 126, and the outer wall surface 122 is located between the first surface 126 and the second surface 127. The first surface 126 is a surface of the first sleeve part 125 facing the second insulating sleeve 130, and the second surface 127 is a surface of the first seat part 124 facing the button part 111. In addition, the outer wall surface 122 is an outer peripheral surface of the first seat part 124 and the first sleeve part 125. The first shaft hole 121 penetrates through the first surface 126 and the second surface 127 in the axial direction AX. The first lateral slit 123 penetrates through the outer wall surface 122 and the inner wall surface 121*a* of the first shaft hole 121, and extends from the first surface 126 to the second surface 127. For example, a section of the first lateral slit 123 on the first sleeve part 125 is perpendicular to the first surface 126.

The second insulating sleeve 130 further has a third surface 136 facing the first insulating sleeve 120 and a fourth surface 137 opposite to the third surface 136, and the outer wall surface 132 is located between the third surface 136 and the fourth surface 137. The third surface 136 is a surface of the second sleeve part 135 facing the first insulating sleeve 120, and the fourth surface 137 is a surface of the second seat part 134 facing the circuit board 12. In addition, the outer wall surface 132 is an outer peripheral surface of the second seat part 134 and the second sleeve part 135. The second shaft hole 131 penetrates through the third surface 136 and the fourth surface 137 in the axial direction AX. The second lateral slit 133 penetrates through the outer wall surface 132 and the inner wall surface 131*a* of the second shaft hole 131, and extends from the third surface 136 to the fourth surface 137. For example, a section of the second lateral slit 133 on the second sleeve part 135 is perpendicular to the third surface 136.

As shown in FIG. 1B to FIG. 1D, the button assembly 100 further includes at least one waterproof ring 140 (two are schematically shown), where the waterproof rings 140 are sleeved on the shaft part 112 and are disposed between the first opening 11*a* and the second opening 11*a*'. In addition, the waterproof rings 140 are located between the first insulating sleeve 120 and the second insulating sleeve 130. The shaft part 112 has a positioning protrusion 114 located between the first opening 11*a* and the second opening 11*a*', where the positioning protrusion 114 is located between the first insulating sleeve 120 and the waterproof rings 140, and the first insulating sleeve 120 is positioned between the button part 111 and the positioning protrusion 114. For example, the positioning protrusion 114 may be a positioning protrusion ring.

On the other hand, the shaft part 112 has a positioning groove 115 located outside the second opening 11*a*' and located in the conductive casing 11, and the button assembly 100 further includes a positioning member 150 clamped in the positioning groove 115. The second insulating sleeve 130 is located between the first insulating sleeve 120 and the positioning member 150, and located between the waterproof rings 140 and the positioning member 150. The positioning member 150 abuts against the second insulating sleeve 130, and the second insulating sleeve 130 is positioned between the waterproof rings 140 and the positioning member 150. For example, the positioning groove 115 may be an annular positioning groove, and the positioning member 150 may be an E-type buckle or a C-type buckle. It should be noted that since the positioning member 150 is often made of a conductive material such as metal, the second seat part 134 of the second insulating sleeve 130 may isolate the positioning member 150 from the inner surface 11*d* of the conductive casing 11, thereby preventing the positioning member 150 from contacting the conductive casing 11 to cause a short circuit.

As shown in FIG. 1C and FIG. 1D, the electronic device 10 further includes a switch 14 disposed in the conductive casing 11 and corresponding to the shaft part 112. In detail, the switch 14 is disposed on a side of the circuit board 12 facing the shaft part 112 and located between the conductive elastic piece 13 and the circuit board 12. The user may press the button part 111 to drive the shaft part 112 to slide toward the switch 14 and trigger the switch 14 to execute an application or perform other functions. For example, during a process that the shaft part 112 slides toward the switch 14, the conductive elastic piece 13 is elastically deformed, and once a pressing force applied to the button part 111 is removed, an elastic restoring force of the conductive elastic piece 13 may drive the conductive button 110 to return to its initial position, for example, to slide back to the initial position.

FIG. 1F1 and FIG. 1F2 are respectively schematic diagrams of a first insulating sleeve and a second insulating sleeve of another example. Different from the first insulating sleeve 120 shown in FIG. 1E1, a section of a first lateral slit 1231 of a first insulating sleeve 1201 shown in FIG. 1F1 on the first sleeve part 125 is inclined to the first surface 126, so as to facilitate sleeving the first insulating sleeve 1201 on the shaft part 112 (referring to FIG. 1B), and distribute an expanded deformation amount of the first lateral slit 1231 at different angles to maintain the first shaft hole 121 as approximately a round hole. Different from the second insulating sleeve 130 shown in FIG. 1E2, a section of a second lateral slit 1331 of a second insulating sleeve 1301 shown in FIG. 1F2 on the second sleeve part 135 is inclined to the third surface 136, so as to facilitate sleeving the second insulating sleeve 1301 on the shaft part 112 (referring to FIG. 1B), and distribute an expanded deformation amount of the second lateral slit 1331 at different angles to maintain the second shaft hole 121 as approximately a round hole.

Figure 2A:
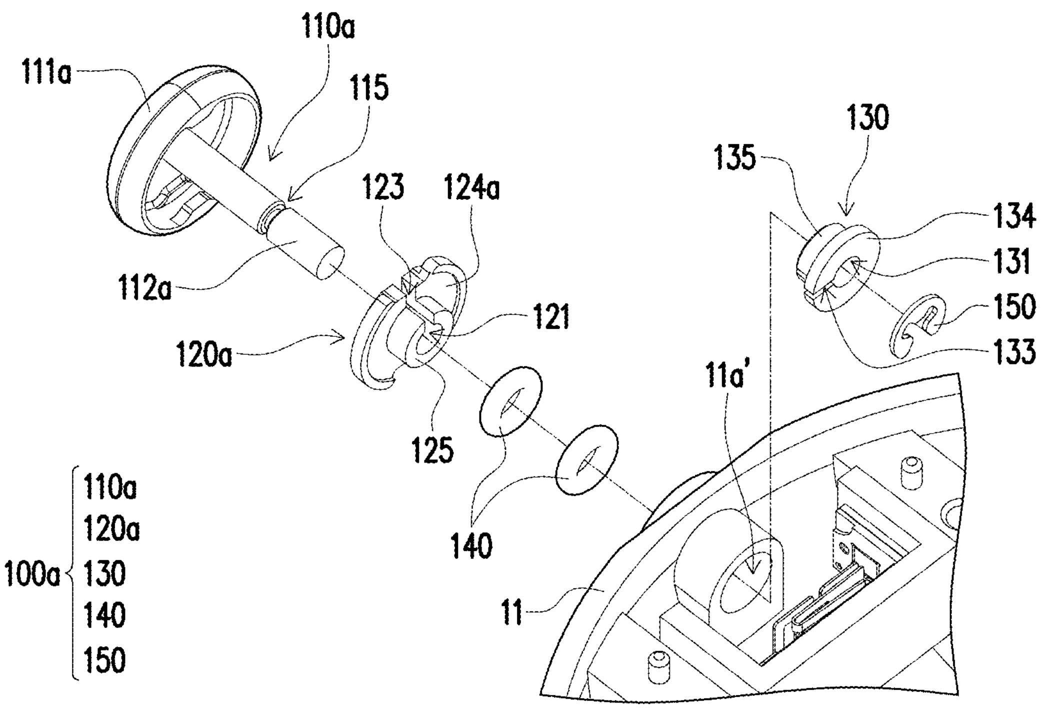
FIG. 2A is a schematic exploded view of an electronic device according to another embodiment of the disclosure.
Figure 2B:
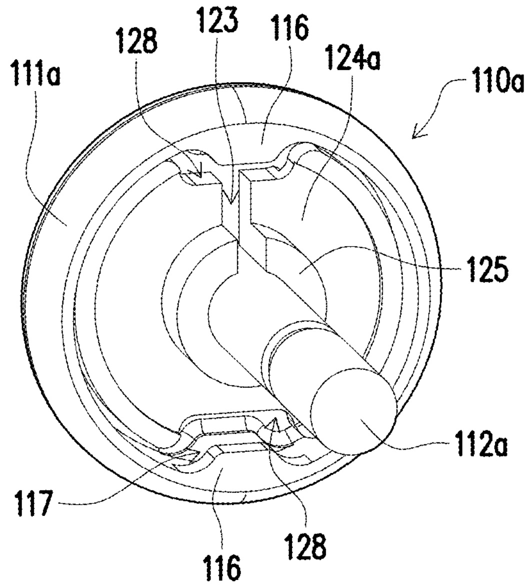
FIG. 2B and FIG. 2C are schematic diagrams of a first insulating sleeve of FIG. 2A being installed and positioned on a conductive button.
Figure 2C:
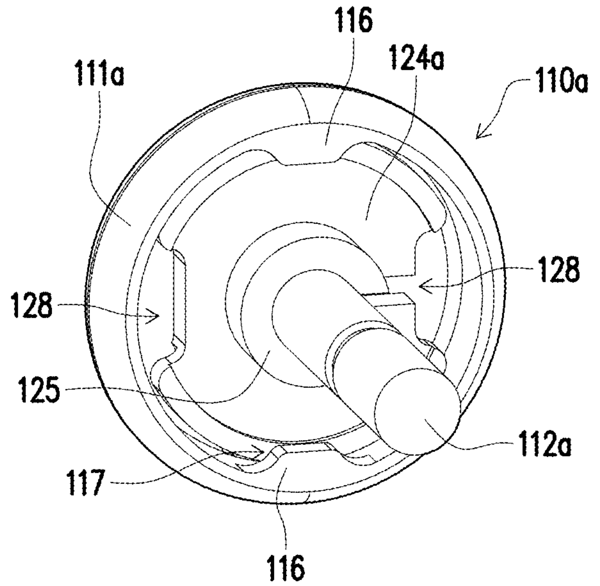
Figure 2D:
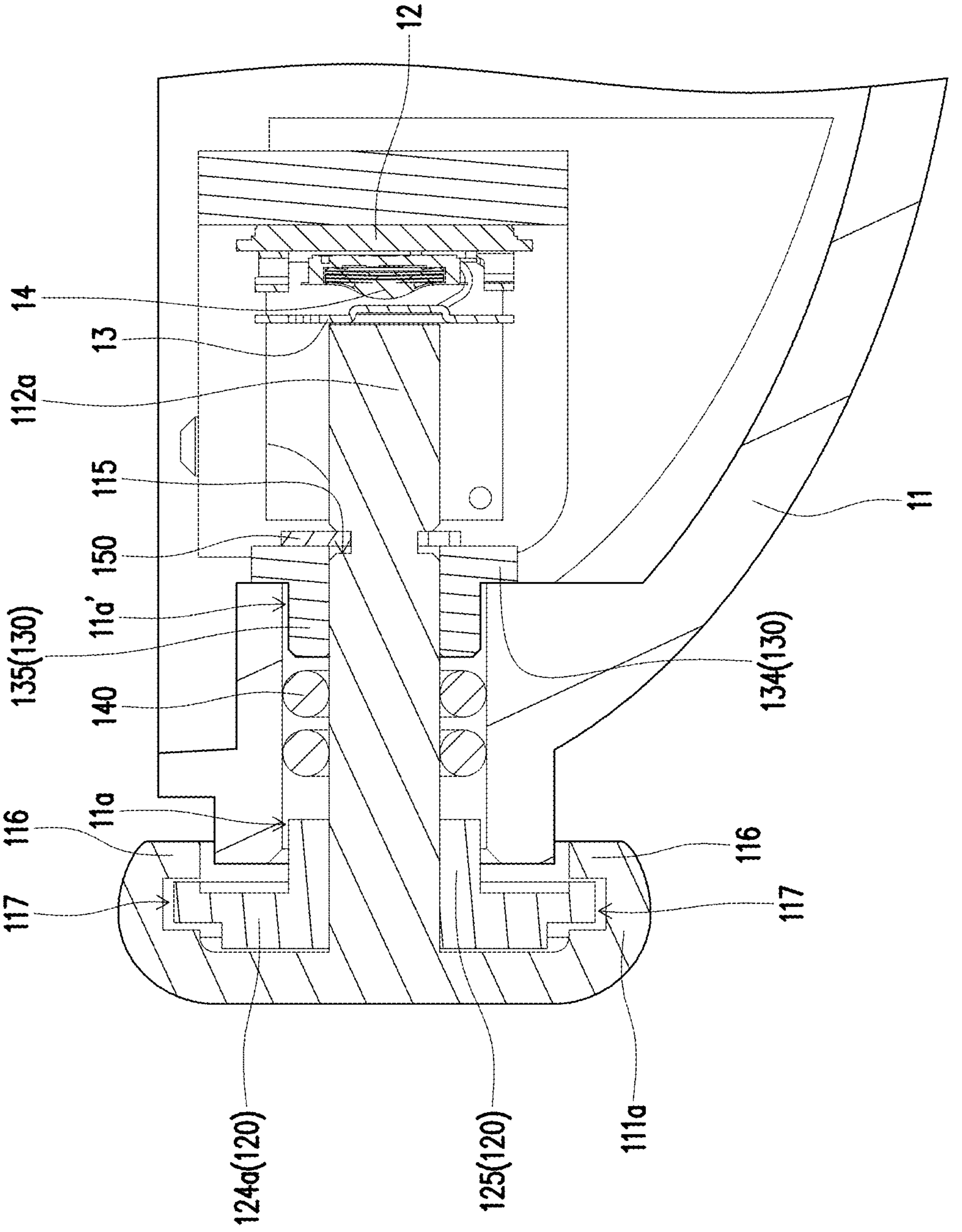
FIG. 2D is a partial schematic cross-sectional view of an electronic device according to another embodiment of the disclosure.

FIG. 2A is a schematic exploded view of an electronic device according to another embodiment of the disclosure. FIG. 2B and FIG. 2C are schematic diagrams of the first insulating sleeve of FIG. 2A being installed and positioned on the conductive button. FIG. 2D is a partial schematic cross-sectional view of an electronic device according to another embodiment of the disclosure. Referring to FIG. 2A to FIG. 2D, a design of a button assembly 100*a* adopted in the electronic device of the embodiment is substantially the same as that of the button assembly 100 adopted in the electronic device 10 of the previous embodiment, and main differences there between are described below.

In the embodiment, a first insulating sleeve 120*a* is adapted to rotatably sleeve the shaft part 112, where a first seat part 124*a* is located in a button part 111*a*, and has two recesses 128 opposite to each other. In addition, the button part 111*a* has two position-limiting protrusions 116 opposite to each other and two position-limiting grooves 117 located on the two position-limiting protrusions 116, where the two position-limiting grooves 117 face each other.

As shown in FIG. 2B to FIG. 2D, when the first insulating sleeve 120*a* is sleeved on the shaft part 112, it may rotate so that the two position-limiting protrusions 116 are located inside the two recesses 128 or outside the two recesses 128. When the two position-limiting protrusions 116 are located inside the two recesses 128, the user may choose to detach the first insulating sleeve 120*a* from the button part 111*a*, or rotate the first insulating sleeve 120*a* to move the two position-limiting protrusions 116 to the outside of the two recesses 128. When the two position-limiting protrusions 116 are located outside the two recesses 128, the first seat part 124*a* is engaged with the two position-limiting grooves 117, so that the first insulating sleeve 120*a* is fixed to the button part 111*a*.

As shown in FIG. 2A, FIG. 2C and FIG. 2D, the first insulating sleeve 120*a* may be installed and fixed at the button part 111*a* through the two position-limiting protrusions 116, so that the shaft part 112*a* is not provided with the positioning protrusion 114 shown in FIG. 1B.

FIG. 2E1 and FIG. 2E2 are respectively schematic diagrams of the first insulating sleeve and the second insulating sleeve of FIG. 2A. Referring to FIG. 2E1, in the first insulating sleeve 120*a*, the first lateral slit 123 is communicated with one of the two recesses 128.

FIG. 2F1 and FIG. 2F2 are respectively schematic diagrams of the first insulating sleeve and the second insulating sleeve of another example. Different from the first insulating sleeve 120*a* shown in FIG. 2E1, a section of a first lateral slit 1232 of a first insulating sleeve 1202 shown in FIG. 2F1 on the first sleeve part 125 is inclined to the first surface 126 to facilitate sleeving the first insulating sleeve 1202 on the shaft part 112 (referring to FIG. 2A), and maintain the first shaft hole 121 as approximately a round hole.

Figure 3A:
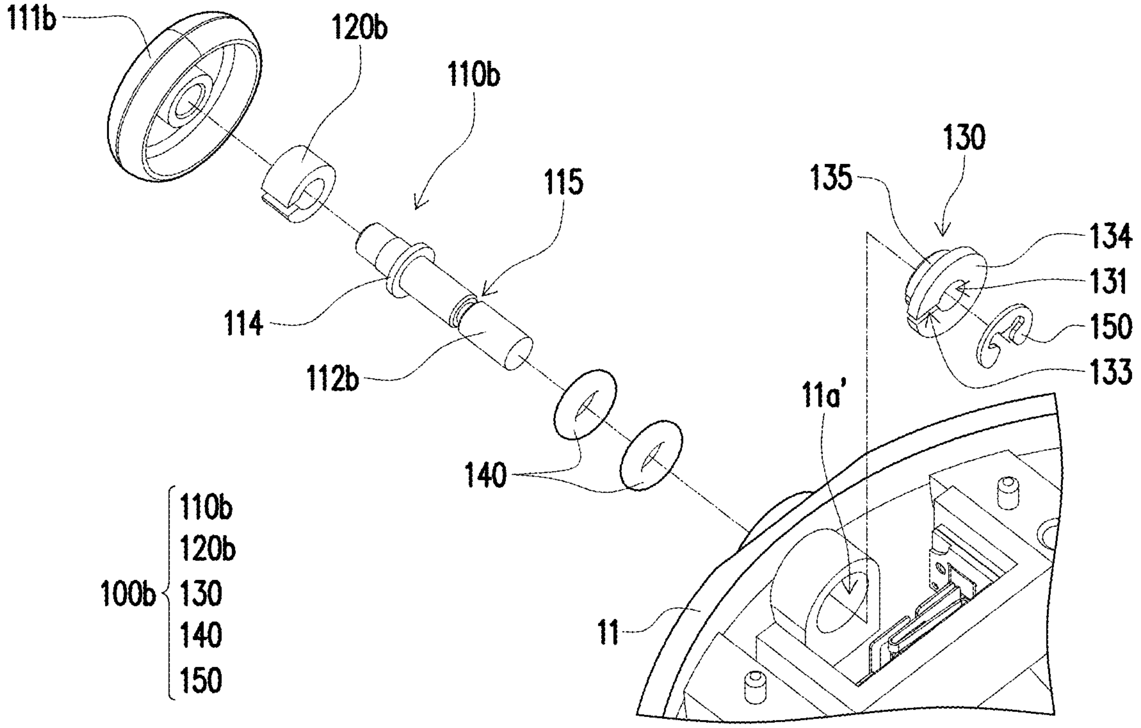
FIG. 3A is a schematic exploded view of an electronic device according to still another embodiment of the disclosure.
Figure 3B:
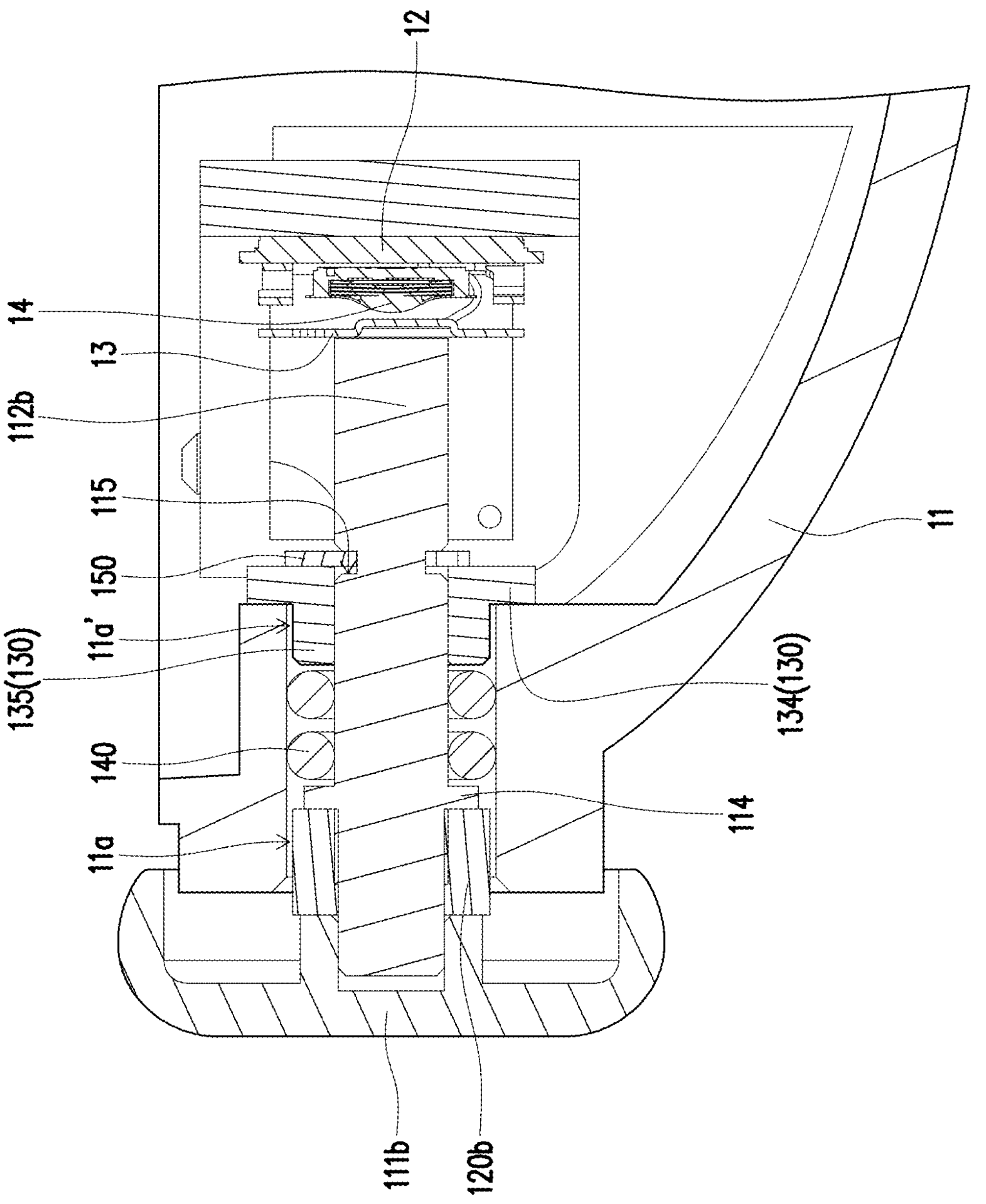
FIG. 3B is a schematic partial cross-sectional view of an electronic device according to still another embodiment of the disclosure.

FIG. 3A is a schematic exploded view of an electronic device according to still another embodiment of the disclosure. FIG. 3B is a schematic partial cross-sectional view of an electronic device according to still another embodiment of the disclosure. FIG. 3C1 and FIG. 3C2 are respectively schematic diagrams of a first insulating sleeve and a second insulating sleeve of FIG. 3A. Referring to FIG. 3A, FIG. 3B, FIG. 3C1, and FIG. 3C2, a design of a button assembly 100*b* adopted in the electronic device of the embodiment is substantially the same as that of the button assembly 100 adopted in the electronic device 10 of the previous embodiment, and main differences there between are described below.

In the embodiment, a button part 111*b* and a shaft part 112*b* are fixed to each other through screwing, and a first insulating sleeve 120*b* is fixed between the button part 111*b* and the positioning protrusion 114. On the other hand, the first insulating sleeve 120*b* is a hollow cylinder with the first lateral slit 123, and the first lateral slit 123 is perpendicular to the first surface 126 and the second surface 127.

FIG. 3D1 and FIG. 3D2 are respectively schematic diagrams of the first insulating sleeve and the second insulating sleeve of another example. Different from the first insulating sleeve 120*b* shown in FIG. 3C1, a first lateral slit 1233 of a first insulating sleeve 1203 shown in FIG. 3D1 is inclined to the first surface 126 and the second surface 127 to facilitate sleeving the first insulating sleeve 1203 on the shaft part 112*b* (referring to FIG. 3A), and maintain the first shaft hole 121 as approximately a round hole.

In summary, in the button assembly and electronic device of the disclosure, the conductive button and the conductive casing are separated by two insulating sleeves, which prevents the pressed conductive button from contacting the conductive casing to cause a short circuit, thus helping to improve operational reliability. On the other hand, since both insulating sleeves have lateral slits, during a process of installing the insulating sleeves on the shaft part of the conductive button, the lateral slits may expand inner diameters of the shaft holes to match an outer diameter of the shaft part. Therefore, the insulating sleeves may be installed and tightly fitted on the shaft part without leaving a gap between the shaft hole and the shaft part, which prevents the conductive button from shaking due to the gap between the shaft hole and the shaft part during operation, and provides a better operating experience to the user. In addition, a sliding gap is only reserved between the outer wall surface of each insulating sleeve and the inner wall surface of the opening of the conductive casing, so that a degree of shaking when pressing the conductive button may be greatly reduced to provide users with an excellent operating feel.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A button assembly, adapted to be installed at a conductive casing, wherein two opposite sides of the conductive casing respectively have a first opening and a second opening, and the first opening is communicated with the second opening, the button assembly comprising:

- a conductive button, comprising a button part and a shaft part connected to the button part, wherein the button part corresponds to the first opening, and the shaft part passes through the second opening from the first opening;
- a first insulating sleeve, comprising a first shaft hole and a first lateral slit communicated with the first shaft hole, wherein the first insulating sleeve is sleeved on the shaft part through the first shaft hole and located at the first opening, wherein the first insulating sleeve comprises a first seat part disposed at the button part and a first sleeve part connected to the first seat part, the first sleeve part is inserted into the first opening, the first shaft hole penetrates through the first seat part and the first sleeve part in an axial direction, and the first lateral slit penetrates through the first seat part and the first sleeve part outwardly from an inner wall surface of the first shaft hole; and
- a second insulating sleeve, comprising a second shaft hole and a second lateral slit communicated with the second shaft hole, wherein the second insulating sleeve is sleeved on the shaft part through the second shaft hole and located at the second opening.

2. The button assembly as claimed in claim 1, wherein there are gaps between an outer wall surface of the first insulating sleeve and an inner wall surface of the first opening, and between an outer wall surface of the second insulating sleeve and an inner wall surface of the second opening, respectively, and an inner wall surface of the first shaft hole and an inner wall surface of the second shaft hole are in contact with an outer wall surface of the shaft part.

3. The button assembly as claimed in claim 1, wherein the first seat part has two recesses opposite to each other, the button part has two position-limiting protrusions opposite to each other and two position-limiting grooves provided on the two position-limiting protrusions, the two position-limiting grooves face each other, the first insulating sleeve is adapted to be rotatably sleeved on the shaft part, so that the two position-limiting protrusions are located inside the two recesses or outside the two recesses, and when the two position-limiting protrusions are located outside the two recesses, the first seat part is engaged with the two position-limiting grooves.

4. The button assembly as claimed in claim 3, wherein the first lateral slit is communicated with one of the two recesses.

5. The button assembly as claimed in claim 1, wherein an outer diameter of the first seat part is larger than an outer diameter of the first sleeve part and an inner diameter of the first opening, and the outer diameter of the first sleeve part is smaller than the inner diameter of the first opening.

6. The button assembly as claimed in claim 1, wherein the first insulating sleeve further has a first surface, a second surface opposite to the first surface, and an outer wall surface located between the first surface and the second surface, the first shaft hole penetrates through the first surface and the second surface, and the first lateral slit penetrates through the outer wall surface and an inner wall surface of the first shaft hole, and extends from the first surface to the second surface.

7. The button assembly as claimed in claim 6, wherein the first lateral slit is perpendicular or inclined to the first surface.

8. The button assembly as claimed in claim 1, wherein the second insulating sleeve further has a third surface, a fourth surface opposite to the third surface, and an outer wall surface located between the third surface and the fourth surface, the second shaft hole penetrates through the third surface and the fourth surface, and the second lateral slit penetrates through the outer wall surface and an inner wall surface of the second shaft hole, and extends from the third surface to the fourth surface.

9. The button assembly as claimed in claim 1, further comprising:

- at least one waterproof ring, sleeved on the shaft part, and located between the first insulating sleeve and the second insulating sleeve.

10. The button assembly as claimed in claim 9, wherein the shaft part has a positioning protrusion located between the first opening and the second opening, and the positioning protrusion is located between the first insulating sleeve and the at least one waterproof ring.

11. The button assembly as claimed in claim 1, wherein the shaft part has a positioning groove, the button assembly further comprises a positioning member clamped in the positioning groove, the second insulating sleeve is located between the first insulating sleeve and the positioning member, and the positioning member abuts against the second insulating sleeve.

12. The button assembly as claimed in claim 1, wherein before the first insulating sleeve is sleeved on the shaft part, an inner diameter of the first shaft hole is smaller than an outer diameter of the shaft part, after the first insulating sleeve is sleeved on the shaft part, the inner diameter of the first shaft hole is equal to the outer diameter of the shaft part, before the second insulating sleeve is sleeved on the shaft part, an inner diameter of the second shaft hole is smaller than the outer diameter of the shaft part, and after the second insulating sleeve is sleeved on the shaft part, the inner diameter of the second shaft hole is equal to the outer diameter of the shaft part.

13. An electronic device, comprising:

- a conductive casing, wherein two opposite sides of the conductive casing have a first opening and a second opening respectively, and the first opening is communicated with the second opening;

a button assembly, installed at the conductive casing, and comprising:

a conductive button, comprising a button part and a shaft part connected to the button part, wherein the button part corresponds to the first opening, and the shaft part passes through the second opening from the first opening;

a first insulating sleeve, comprising a first shaft hole and a first lateral slit communicated with the first shaft hole, wherein the first insulating sleeve is sleeved on the shaft part through the first shaft hole and located at the first opening; and a second insulating sleeve, comprising a second shaft hole and a second lateral slit communicated with the second shaft hole, wherein the second insulating sleeve is sleeved on the shaft part through the second shaft hole and located at the second opening, wherein the second insulating sleeve comprises a second seat part abutting against the conductive casing and a second sleeve part connected to the second seat part, the second sleeve part is inserted into the second opening, the second shaft hole penetrates through the second seat part and the second sleeve part in an axial direction, the second lateral slit penetrates through the second seat part and the second sleeve part outwardly from an inner wall surface of the second shaft hole, an outer diameter of the second seat part is larger than an outer diameter of the second sleeve part and an inner diameter of the second opening, and the outer diameter of the second sleeve part is smaller than the inner diameter of the second opening;

a circuit board, disposed in the conductive casing and corresponding to the second opening; and a conductive elastic piece, disposed between the second insulating sleeve and the circuit board, wherein the shaft part extends toward the circuit board, and the conductive elastic piece electrically contacts the shaft part and the circuit board.

14. The electronic device as claimed in claim 13, further comprising:

a switch, disposed on the circuit board, and located between the conductive elastic piece and the circuit board.

* * * * *